United States Patent
Yamamoto et al.

(10) Patent No.: US 11,768,682 B2
(45) Date of Patent: Sep. 26, 2023

(54) PHYSICAL QUANTITY DETECTION DEVICE

(71) Applicant: Hitachi Astemo, Ltd., Hitachinaka (JP)

(72) Inventors: Takahiro Yamamoto, Hitachinaka (JP); Takahiro Miki, Hitachinaka (JP); Akira Kotabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 60 days.

(21) Appl. No.: 17/628,460

(22) PCT Filed: Jul. 14, 2020

(86) PCT No.: PCT/JP2020/027319
§ 371 (c)(1),
(2) Date: Jan. 19, 2022

(87) PCT Pub. No.: WO2021/024710
PCT Pub. Date: Feb. 11, 2021

(65) Prior Publication Data
US 2022/0318010 A1 Oct. 6, 2022

(30) Foreign Application Priority Data

Aug. 2, 2019 (JP) ................................. 2019-142702

(51) Int. Cl.
*G06F 9/30* (2018.01)
*G06F 9/355* (2018.01)

(52) U.S. Cl.
CPC .......... *G06F 9/3001* (2013.01); *G06F 9/3004* (2013.01); *G06F 9/3555* (2013.01)

(58) Field of Classification Search
CPC .... G06F 9/3001; G06F 9/3004; G06F 9/3555; G01F 1/696; G01M 15/042
See application file for complete search history.

(56) References Cited

U.S. PATENT DOCUMENTS

| | | | | |
|---|---|---|---|---|
| 4,559,954 A | * | 12/1985 | Murase | G01K 7/25 374/E13.002 |
| 2009/0256974 A1 | * | 10/2009 | Mukai | G03B 21/006 348/751 |
| 2012/0233515 A1 | * | 9/2012 | Suzuki | G01D 3/022 714/E11.023 |

FOREIGN PATENT DOCUMENTS

| | | |
|---|---|---|
| JP | 3-66605 B2 | 10/1991 |
| JP | 2004-294110 A | 10/2004 |
| JP | 2012-58192 A | 3/2012 |

OTHER PUBLICATIONS

International Search Report (PCT/ISA/210) issued in PCT Application No. PCT/JP2020/027319 dated Nov. 17, 2020 with English translation (four (4) pages).

(Continued)

*Primary Examiner* — Farley Abad
(74) *Attorney, Agent, or Firm* — Crowell & Moring LLP

(57) ABSTRACT

A physical quantity detection device that can improve arithmetic resolution while preventing an increase in memory capacity is obtained. A physical quantity detection device 100 according to the present invention includes: a physical quantity detection sensor that detects a physical quantity of a measurement target gas; a storage unit that records a correction amount corresponding to a detection value of the physical quantity detection sensor; and an arithmetic unit 110 that performs output adjustment of the detection value using the detection value and the correction amount. Resolution of the storage unit 120 is lower than arithmetic resolution of the arithmetic unit 110.

5 Claims, 8 Drawing Sheets

SENSOR CHARACTERISTIC

(56) References Cited

OTHER PUBLICATIONS

Japanese-language Written Opinion (PCT/ISA/237) issued in PCT Application No. PCT/JP2020/027319 dated Nov. 17, 2020 (three (3) pages).

* cited by examiner

FIG. 3

| DATA WIDTH | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| ΔX1 (P) | * | * | * | * | * | * | * | * | * | * | * | * | * | * | * | * | * | * | * | 0 |
| ΔX1*16 (Q) | * | * | * | * | * | * | * | * | * | * | * | * | * | * | * | * | * | * | * | * |
| ΔX1*G1 (R) | 0 | * | * | * | * | * | * | * | * | * | * | * | * | * | * | * | 0 | 0 | 0 | 0 |
| ΔX4 (S) | 0 | 0 | * | * | * | * | * | * | * | * | * | * | * | * | * | * | * | * | 0 | 0 |

INFORMATION ABOUT LOWER BIT IS LOST WHEN RESOLVING POWER DIFFERENCE IS SHIFTED LEFT, AND CONSTANT SETTING CAN PERFORM ONLY BY 16-NOTCH

REDUCE NOTCH IN HALF BY SHIFTING WITH OFFSET TERM IN CONSIDERATION OF CORRECTION VALUE RANGE

PERFORM SCALING CONVERSION WITH NO USE OF UPPER BIT IN CONSIDERATION OF CORRECTION VALUE RANGE

SENSOR CHARACTERISTIC

CORRECTION MAP OUTPUT VALUE

FIG. 7

| DATA WIDTH | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| ΔX | * | 1 | 1 | 1 | * | * | * | * | * | * | * | * | * | * | * | * | * | * | * | * |
| ΔX1 | 0 | 0 | * | * | * | * | * | * | * | * | * | * | * | * | * | * | * | * | * | * |
| ΔX2 | 0 | 0 | 0 | * | * | * | * | * | * | * | * | * | * | * | * | * | * | 0 | 0 | 0 |
| ΔX4 | * | * | * | * | * | * | * | * | * | * | * | * | * | * | * | * | * | * | * | * |

P1: ΔX
Q1: ΔX1
R1: ΔX2
S1: ΔX4

PERFORM SCALING CONVERSION WITH NO USE OF UPPER BIT IN CORRECTION AMOUNT RANGE MORE THAN OR EQUAL TO THRESHOLD IN WHICH HIGH ARITHMETIC ACCURACY IS REQUIRED

PHYSICAL QUANTITY DETECTION DEVICE

TECHNICAL FIELD

The present invention relates to a physical quantity detection device.

BACKGROUND ART

PTL 1 describes that "An offset voltage correction device includes: an EEPROM that stores correction data corresponding to each correction target temperature obtained by dividing a predetermined temperature range at a predetermined interval; a temperature sensor that detects a temperature of an acceleration sensor; a ROM I/F that reads first correction data corresponding to a first correction target temperature lower than a detected temperature and second correction data corresponding to a second correction target temperature higher than the detected temperature from the EEPROM, the first correction data and the second correction data being adjacent to each other with respect to the detected temperature; and a correction arithmetic circuit that calculates a value obtained by dividing a difference between the read first correction data and second correction data by a remaining number of bits obtained by subtracting bits used for the correction data from all bits of an output value from the temperature sensor as correction data of the detection temperature".

CITATION LIST

Patent Literature

PTL 1: JP 2004-294110 A

SUMMARY OF INVENTION

Technical Problem

In a physical quantity detection device (for example, an air flow sensor) that detects a flow rate of intake air taken into an internal combustion engine, when the flow rate of the intake air is small, a change amount of a digital value corresponding to 16 bits obtained by A/D conversion of an input value indicating the flow rate becomes very small, and a variation in an output characteristic occurs due to insufficient resolution. Accordingly, a method for reducing the variation in the output characteristic by improving arithmetic resolution of a digital signal processor (DSP) in a large scale integrated circuit (LSI) of the physical quantity detection device is considered.

When the arithmetic resolution is increased from the conventional 16 bits to 20 bits, a 20-bit memory is usually used also for a memory in the LSI storing a constant and the like used for arithmetic operation. In this case, because a memory having a capacity 16 times that of the conventional memory (16 bits) is used, a highly functional memory for required specifications is provided, and the cost increases. For this reason, the improvement of the arithmetic resolution is required while a specification of the memory is suppressed.

In an offset voltage correction device described in PTL 1, a correction map input value is divided into a temperature value and a complement arithmetic value, and a difference between grid points of a correction map is divided by a complement arithmetic value to calculate a complement value, thereby reducing the number of data points (capacity) of the correction map stored in the memory (EEPROM). However, because both a memory and a correction arithmetic circuit have the same resolution (16 bits), PTL 1 does not consider that the arithmetic resolution is improved while the specification of the memory is suppressed.

The present invention has been made in view of the above points, and an object of the present invention is to provide a physical quantity detection device that can improve the arithmetic resolution while suppressing an increase in memory capacity.

Solution to Problem

In order to solve the above problem, a physical quantity detection device according to one aspect of the present invention includes a physical quantity detection sensor that detects a physical quantity of a measurement target gas, a storage unit that records a correction amount corresponding to a detection value of the physical quantity detection sensor, and an arithmetic unit that performs output adjustment of the detection value using the detection value and the correction amount. Resolution of the storage unit is lower than arithmetic resolution of the arithmetic unit.

Advantageous Effects of Invention

According to the present invention, the arithmetic resolution can be improved while the increase in the memory capacity is prevented. Further features associated with the present invention will become apparent from the description of the present description and the accompanying drawings. Problems, configurations, and effects other than those described above will be clarified by the following description of embodiments.

BRIEF DESCRIPTION OF DRAWINGS

FIG. 3 is a diagram illustrating an example of an assignment status of an input value of a 20-bit data width.

FIG. 7 is a diagram illustrating an example of the assignment status of the input value of the 20-bit data width.

DESCRIPTION OF EMBODIMENTS

Hereinafter, an embodiment of the present invention will be described.

First Embodiment

Figure 1:
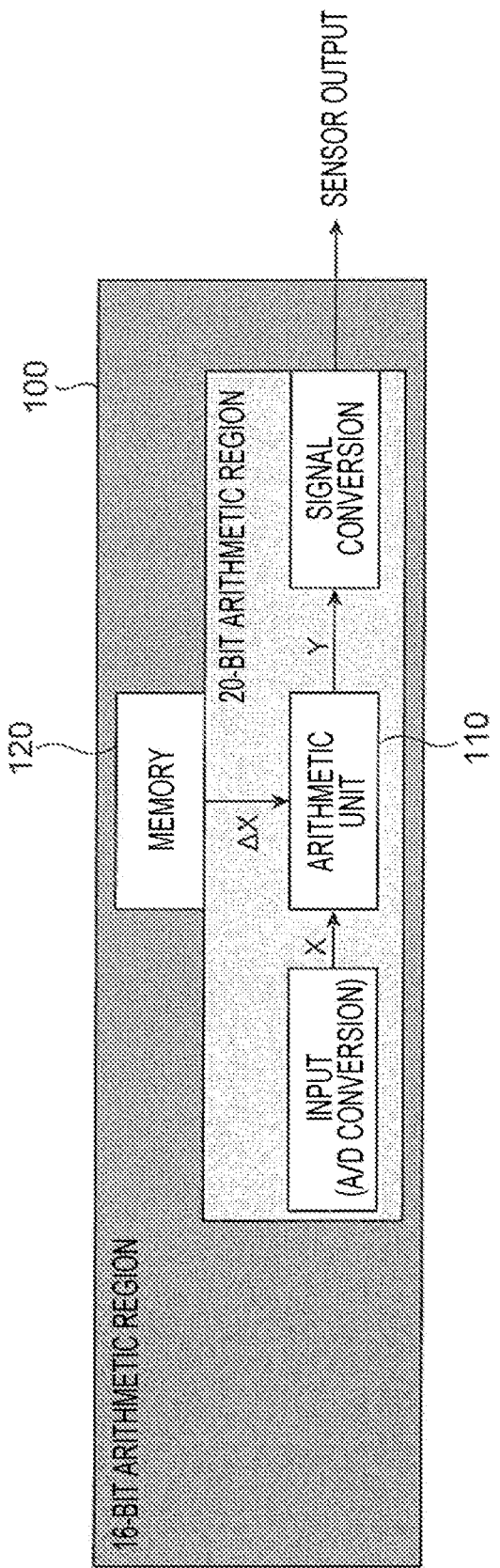
FIG. 1 is a diagram illustrating an example of an internal configuration of a physical quantity detection device (air flow sensor) according to a first embodiment.

FIG. 1 is a diagram illustrating an example of an internal configuration of a physical quantity detection device according to a first embodiment.

For example, in the physical quantity detection device of the first embodiment, it is assumed that an air flow sensor 100 detects a flow rate of intake air taken into an internal combustion engine. The air flow sensor 100 includes a physical quantity detection sensor that detects a physical quantity of intake air (measured gas) and outputs a detection signal, and an LSI.

The air flow sensor 100 performs correction arithmetic operation using an arithmetic unit 110 inside the LSI in order to correct an output value (detection value) of the air flow rate detected by the physical quantity detection sensor. Specifically, the air flow sensor 100 converts the detection signal (for example, a signal including a voltage value indicating the air flow rate) indicating the air flow rate output from the physical quantity detection sensor into a digital value using an A/D converter in the LSI, performs the correction arithmetic operation using the arithmetic unit 110, converts the signal, and outputs the converted signal to the sensor.

As illustrated, the LSI includes the arithmetic unit 110 (for example, CPU: Central Processing Unit) and a memory 120 (for example, EEPROM). The memory 120 belongs to a 16-bit arithmetic region, and the arithmetic unit 110 belongs to a 20-bit arithmetic region. The memory 120 in the 16-bit arithmetic region stores (records) a correction amount corresponding to the detection value of the detected air flow rate, which is a constant used for the correction arithmetic operation for correcting the detection value. That is, the correction amount resolution of the memory 120 functioning as the information storage unit is 16 bits, which is set to be lower than the arithmetic resolution (20 bits) of the arithmetic unit 110.

The arithmetic unit 110 performs the correction arithmetic operation for correcting the detection value of the detected air flow rate to adjust the output. Before performing the correction arithmetic operation, the arithmetic unit 110 refers to a correction amount ΔX in the memory 120 by table conversion, performs arithmetic processing for reducing a resolution difference (4 bits) between the 16-bit memory 120 and the 20-bit arithmetic unit 110, and calculates a correction amount in which the resolution difference is reduced. In addition, the arithmetic unit 110 performs the correction arithmetic operation of the detection value using the calculated value of the correction amount. The arithmetic unit 110 performs the arithmetic processing of the detection value with high resolution (20 bits), and performs scaling conversion to an output resolution (16 bits) when converting a value Y of an arithmetic result into a signal to output the signal as a final output value to the sensor.

Figure 2:
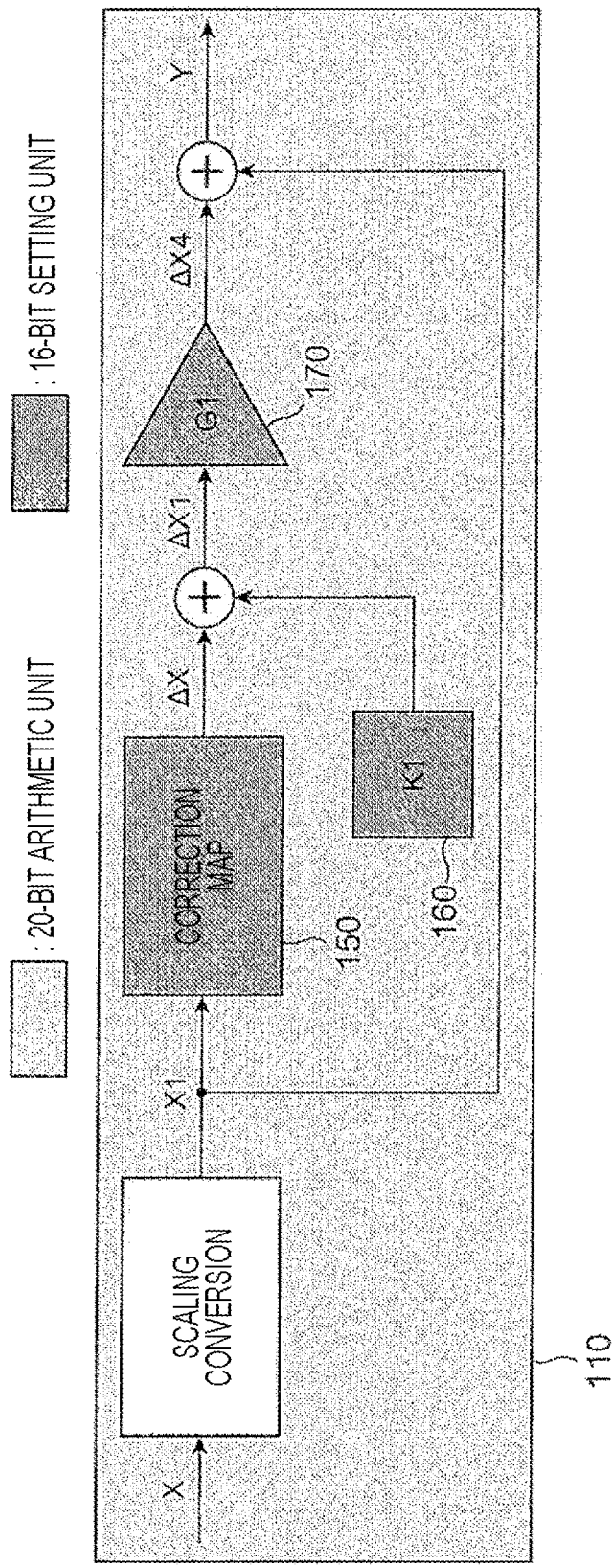
FIG. 2 is a diagram illustrating an example of an internal configuration of an arithmetic unit.

FIG. 2 is a diagram illustrating an example of the internal configuration of the arithmetic unit 110. As illustrated in FIG. 2, the arithmetic unit 110 performs scaling conversion on a detection value X of the A/D converted air flow rate to calculate a converted value X1. Furthermore, the arithmetic unit 110 refers to the memory 120 in the 16-bit arithmetic region to store the correction amount ΔX corresponding to the detection value X (or X1) of the air flow rate in a correction map 150. In addition, the arithmetic unit 110 multiplies a value ΔX1 obtained by adding an offset term K1 (160) to the correction amount ΔX by a gain term G1 (170) and calculates a correction amount ΔXn (ΔX4 in FIG. 2) in which the resolution difference between the memory 120 and the arithmetic unit 110 is reduced. The addition of the offset term K1 (160) will be described with reference to FIG. 5.

FIG. 3 is a diagram illustrating an example of an assignment status of an input value in a width of the 20-bit data. As illustrated, in a data width of 20 bits, a side close to a bit number 19 is an upper bit, and a side close to a bit number 0 is a lower bit. When the correction arithmetic operation is performed with the 20-bit arithmetic resolution, an input value representing a high flow rate region is assigned to the upper bit side, and an input value representing a low flow rate region is assigned to the lower bit side. "*" indicates that a value representing a flow rate region corresponding to the corresponding bit number is input.

A row P in FIG. 3 indicates that the correction amount ΔX is 16-bit information having input values in the bit numbers 0 to 15 and does not include information about the upper 4 bits representing the high flow rate region.

The correction amount ΔX that does not have information about the high-order 4 bits is the 16-bit information stored in the memory 120 in the 16-bit arithmetic region, and is caused by the resolution difference from the arithmetic unit 110 in the 20-bit arithmetic region.

The arithmetic processing for reducing the resolution difference between the memory 120 and the arithmetic unit 110 will be described with reference to FIGS. 2 and 3.

The arithmetic unit 110 calculates the correction amount ΔX using the correction map 150 referred to from the memory 120, and adds the offset term K1 (160) to the calculated correction amount ΔX to obtain ΔX1. When ΔX1 is multiplied by the gain term G1 (170)=16, the bit number having the input value is shifted leftward by 4 bits as compared with ΔX1 as illustrated in a row Q of FIG. 3. That is, by the multiplication of the gain term G1 (170), the information about the low-order 4 bits (bit numbers 0 to 3) is lost, an EEPROM constant is set not in increments of 1 but in increments of 16 (4 bits), and the information about the high-order 4 bits (bit numbers 16 to 19) is obtained.

Furthermore, when ΔX1 is multiplied by the gain term G1 (170)=8, the bit number having the input value is shifted leftward by 3 bits as compared with ΔX1 as illustrated in a row R of FIG. 3. That is, by the multiplication of the gain term G1 (170), the information about the low-order 3 bits (bit numbers 0 to 2) is lost, but the information about the high-order 3 bits (bit numbers 16 to 18) is obtained.

When ΔX1 is multiplied by the gain term G1 (170) of the predetermined value, as illustrated in a row S of FIG. 3, a bit position having the input value is shifted leftward by 2 bits as compared with ΔX1. That is, by the multiplication by the gain term G1 (170), the bit position having no input value can be disposed for 2 bits on each of the high-order side and the low-order side.

The arithmetic unit 110 can appropriately adjust the bit position having no input value by multiplying the correction amount ΔX1 by the gain term G1 (170).

The correction amount in which the resolution difference between the low-resolution memory 120 and the high-resolution arithmetic unit 110 is reduced can be calculated by an arithmetic expression including the gain term G1 (170) with respect to the correction amount ΔX1.

After performing the arithmetic operation (arithmetic expression: ΔX4=ΔX+K1×G1) including the offset term K1 (160) and the gain term G1 (170), the arithmetic unit 110 performs the correction arithmetic operation using correction amounts ΔX4 and X1 to obtain the value Y.

According to the air flow sensor 100, the arithmetic resolution can be improved while suppressing an increase in the memory capacity. In particular, the air flow sensor uses a predetermined arithmetic expression to perform the correction arithmetic operation using the correction amount obtained by reducing the resolution difference between the low-resolution memory and the high-resolution arithmetic unit. Thus, the air flow sensor can improve the arithmetic resolution while suppressing the increase in the memory capacity.

Figure 4:
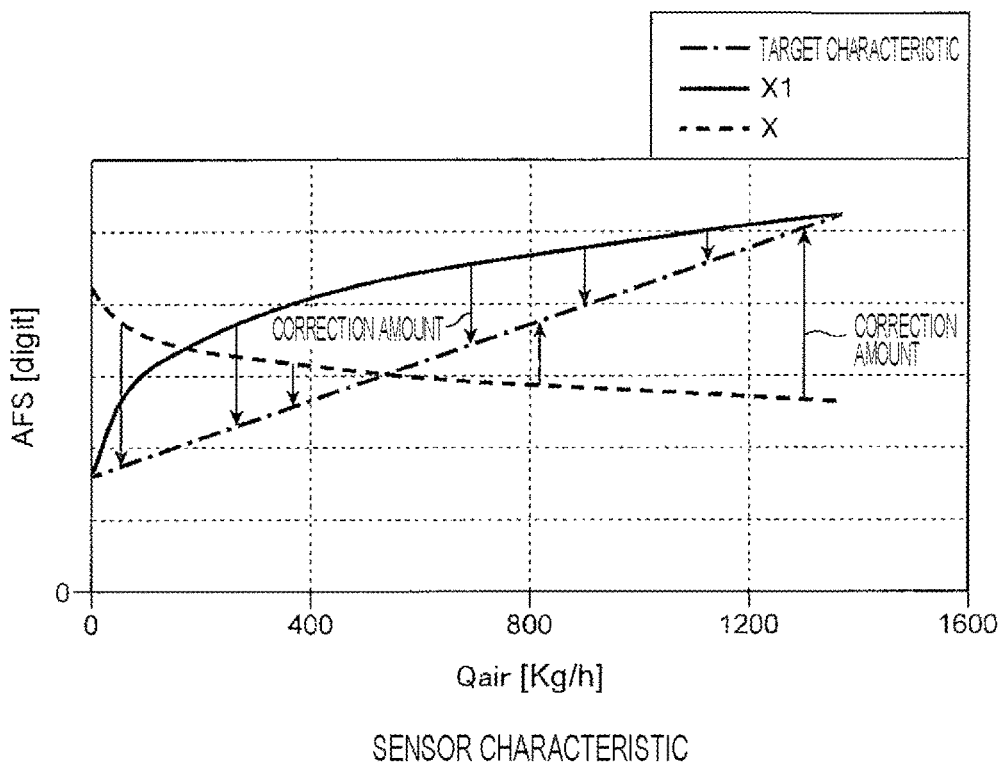
FIG. 4 is a diagram illustrating an example of a sensor characteristic of the air flow sensor.

FIG. 4 is a diagram illustrating an example of the sensor characteristic of the air flow sensor 100. As illustrated in FIG. 4, a horizontal axis represents magnitude Qair [Kg/h] of the sucked air flow rate, and a vertical axis represents an output value AFS [digit] of the air flow sensor. A curve indicated by a broken line indicates the detection value X of the air flow rate (raw data) before the scaling conversion, and a curve indicated by a solid line indicates the detection value X1 after the scaling conversion. In addition, a straight line indicated by an alternate long and short dash line indicates a target characteristic of the value Y after the correction arithmetic operation.

Figure 5:
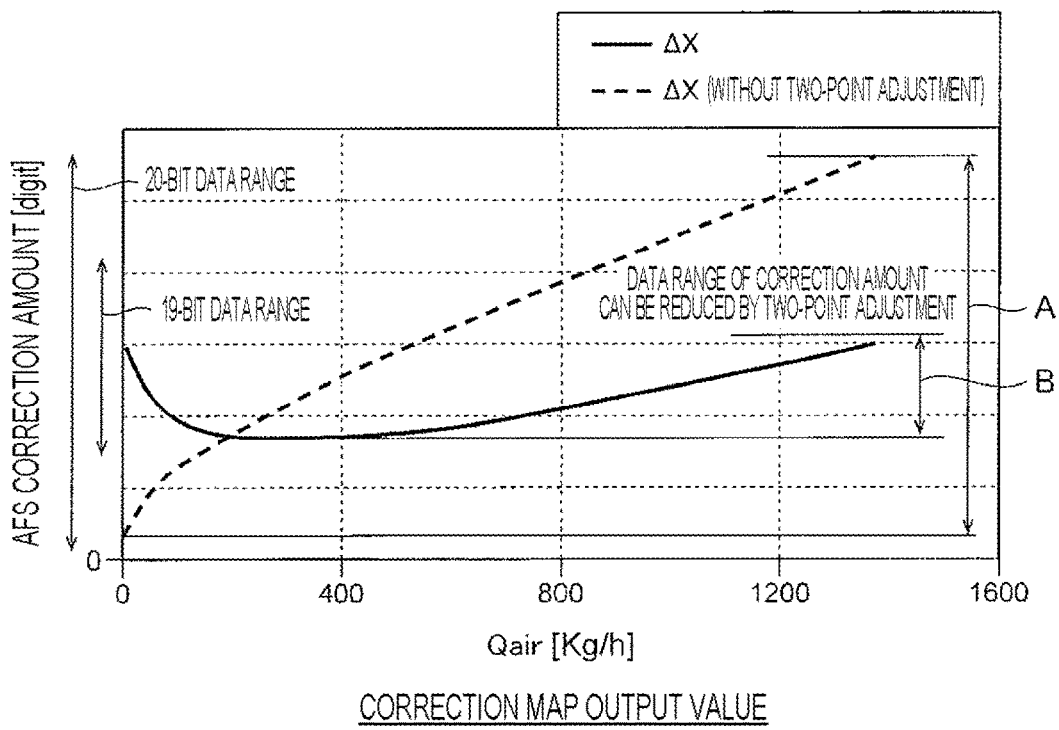
FIG. 5 is a diagram illustrating an example of a relationship between a correction amount (an output value of a correction map) ΔX in FIG. 4 and an intake air flow rate.

FIG. 5 is a diagram illustrating an example of a relationship between the correction amount (an output value of the correction map 150) ΔX in FIG. 4 and the intake air flow rate. As illustrated in FIG. 5, the horizontal axis represents the magnitude Qair [Kg/h] of the air flow rate, and the vertical axis represents the correction amount [digit]. In addition, a curve indicated by a broken line indicates the correction amount ΔX in which the scaling conversion is not performed on the detection value X, and a curve indicated by a solid line indicates the correction amount ΔX in which the scaling conversion is performed on the detection value X.

Processing of the scaling conversion (two-point adjustment) in FIG. 2 will be described with reference to FIGS. 4 and 5. As illustrated in FIG. 4, it can be seen that a relatively wide interval is provided between the detection value X indicated by the broken line and the target characteristic of the value Y indicated by the solid line, and that the correction amount ΔX is large. For this reason, as illustrated in FIG. 5, when the scaling conversion is not performed, a range A of the correction amount ΔX is wide, and the use of a 20-bit data range is required to express the correction amount ΔX.

On the other hand, when the scaling conversion is performed on the detection value X, the broken line X in FIG. 4 is converted into the solid line X1. The solid line X1 has a smaller interval to the target characteristic of the value Y than the broken line X in which the scaling conversion is not performed. This indicates that the value of the correction amount ΔX can be set small. For this reason, as illustrated in FIG. 5, the data range of the correction amount ΔX can be reduced from the range A to a range B, and the correction amount ΔX can be kept within the 19-bit data range.

That is, the difference between the output characteristic X1 at the time of input to the correction map 150 and the target characteristic of the value Y after the correction arithmetic operation is reduced by performing the scaling conversion on the detection value X, and as a result, the data range used to express the correction amount ΔX can be reduced. For this reason, the correction amount ΔX can be expressed with no use of the entire data range (20 bits) of the arithmetic resolution. As a result, the air flow sensor 100 can improve the arithmetic resolution while suppressing the increase in the memory capacity.

The scaling conversion is performed by performing the arithmetic operation using an n-th expression (n is an integer) to the detection value X. For example, the solid line X1 in FIG. 4 is obtained by converting the broken line X by scaling conversion using the linear expression ($y=ax+b$, a and b are constants). Because the linear expression is the simple arithmetic expression using only the constants a and b, there is an advantage that the linear expression is easy to handle. In addition, because the number of constants to be used is small in the scaling conversion of the linear expression, there is an advantage that the increase in the memory capacity can be prevented and a processing load on the arithmetic unit can be reduced.

When a quadratic expression (for example, $y=ax^2+bx+c$) or an m-th order expression (m is an integer of 3 or more) is used for the scaling conversion, a shape of the curve after the scaling conversion can be finely adjusted. For this reason, the interval between the value Y indicated by the straight line and the target characteristic can be more finely narrowed, and there is an advantage that the data width (data range) of the correction amount ΔX can be further reduced. In the linear expression, the detection value X of x=flow rate is used. However, in the case of the m-th order expression, for example, values corresponding to predetermined elements such as x1=detection value a of flow rate, x2=temperature β, and x3=humidity γ may be used.

The arithmetic operation using the offset term K1 (160) in FIG. 2 will be described. As illustrated in FIG. 5, the curve indicating the correction amount ΔX after the scaling conversion is located in the lower half of the 19-bit data range. At this point, when the offset term K1 (160) of a predetermined value is added to the correction amount ΔX, the position of the curve of the correction amount ΔX can be shifted (moved) in parallel in the vertical direction. Specifically, by adding the offset term K1 (160) that is a predetermined value to the correction amount ΔX, the curve position of the correction amount ΔX can be shifted upward and adjusted so as to fall within the 18-bit data range.

In this manner, by adding the offset term K1 (160) to the correction amount ΔX, the data range of the correction amount ΔX to be used can be further narrowed. That is, the resolution difference from the arithmetic unit can be reduced by performing the arithmetic operation according to the offset term K1 (160), and as a result, the air flow sensor 100 can improve the arithmetic resolution while suppressing the increase in the memory capacity.

Second Embodiment

Figure 6:
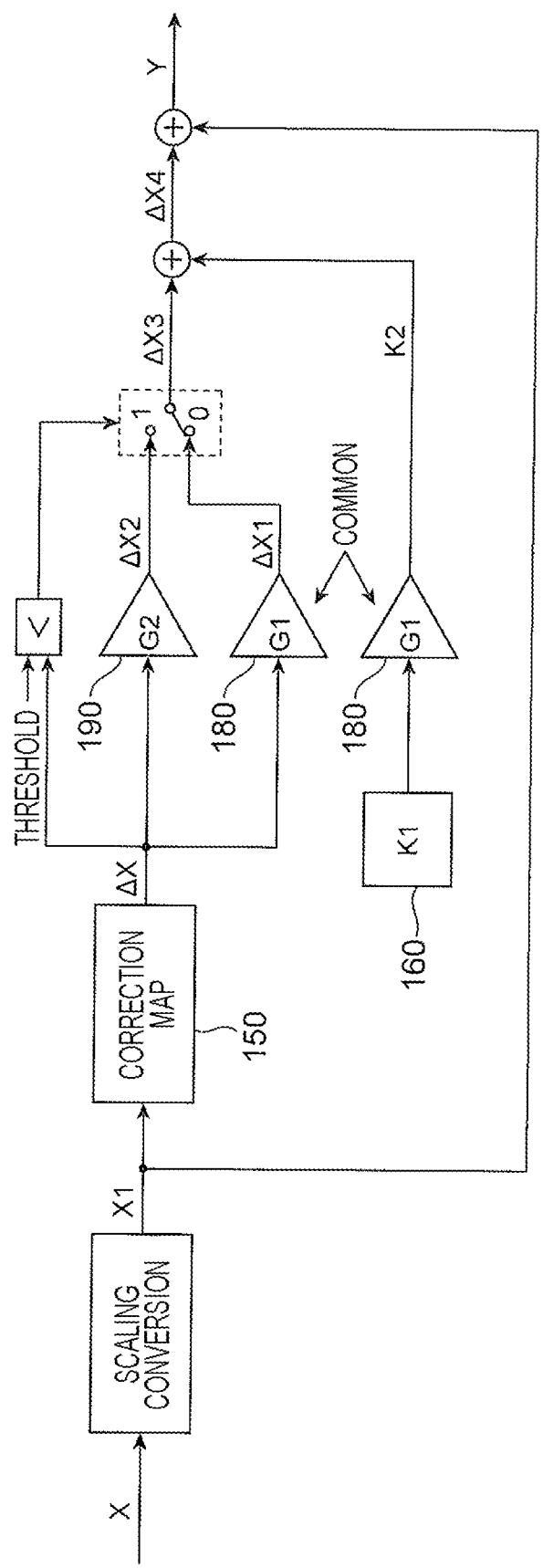
FIG. 6 is a diagram illustrating an example of an outline of an internal configuration of an arithmetic unit in an air flow sensor according to a second embodiment.

FIG. 6 is a diagram illustrating an example of an internal configuration of an arithmetic unit 110 in an air flow sensor 100 according to a second embodiment. As illustrated in FIG. 6, the arithmetic unit 110 of the second embodiment has a feature of switching and selecting a gain term G1 (180) and a gain term G2 (190) used for the arithmetic operation according to the magnitude of the correction amount ΔX output from a correction map 150. Because K1 in FIG. 6 is similar to the arithmetic processing based on the offset term described in the first embodiment, the detailed description will be omitted.

Specifically, the arithmetic unit 110 compares the correction amount ΔX output from the correction map 150 with a predetermined threshold (for example, it is assumed that the threshold is stored in the memory 120). Then, when the correction amount ΔX is greater than or equal to the threshold, the arithmetic unit 110 multiplies the gain term G2 (190) and shifts the bit position having no input value to the upper bit side. On the other hand, when the correction amount ΔX is less than the threshold, the arithmetic unit 110 multiplies the gain term G1 (180) and shifts the bit position having no input value to the lower bit side. The correction amounts after the arithmetic operation using the gain terms G1 (180) and G2 (190) are defined as correction amounts ΔX1 and ΔX2, respectively, and ΔX3 in FIG. 6 indicates one of the correction amounts ΔX1 and ΔX2.

FIG. 7 is a diagram illustrating an example of the assignment status of the input value of the 20-bit data width. As illustrated in the row Q1 of FIG. 7, the bit position having the input value can be shifted to the high flow rate region side by multiplying the correction amount ΔX by the gain term G1 (180). That is, by performing the arithmetic operation using the gain term G1 (180), the arithmetic unit 110 can assign the input value to the upper bit side such as the bit numbers 16 to 18. The correction amount ΔX1 that can more intensively correct the high flow rate region side can be calculated by such the arithmetic operation.

In addition, as illustrated in the row R1 of FIG. 7, the bit position having the input value can be shifted to the low flow rate region side by multiplying the correction amount ΔX by the gain term G2 (190). That is, the arithmetic unit 110 can assign the input value to the lower bit side such as bit numbers 0 to 2 by performing the arithmetic operation using the gain term G2 (190). The correction amount ΔX2 that can more intensively correct the low flow rate region side can be calculated by such the arithmetic operation.

The arithmetic unit 110 appropriately switches and selects a plurality of arithmetic expression including different gain terms according to the value of the correction amount ΔX. When the correction amount ΔX is greater than or equal to the threshold, the arithmetic expression for multiplying the correction amount ΔX by the gain term G2 (190) is selected, and the correction amount ΔX2 that is the arithmetic result is set as the correction amount ΔX3. Then, when the correction amount ΔX is less than the threshold, then arithmetic expression for multiplying the correction amount ΔX by the gain term G1 (180) is selected, and the correction amount ΔX1 that is the arithmetic result is set as the correction amount ΔX3. Thus, the arithmetic unit 110 performs the scaling conversion so as not to use the upper bit in the correction amount region greater than or equal to the threshold for which the high arithmetic accuracy is required, and the arithmetic resolution can be intensively improved.

Figure 8:
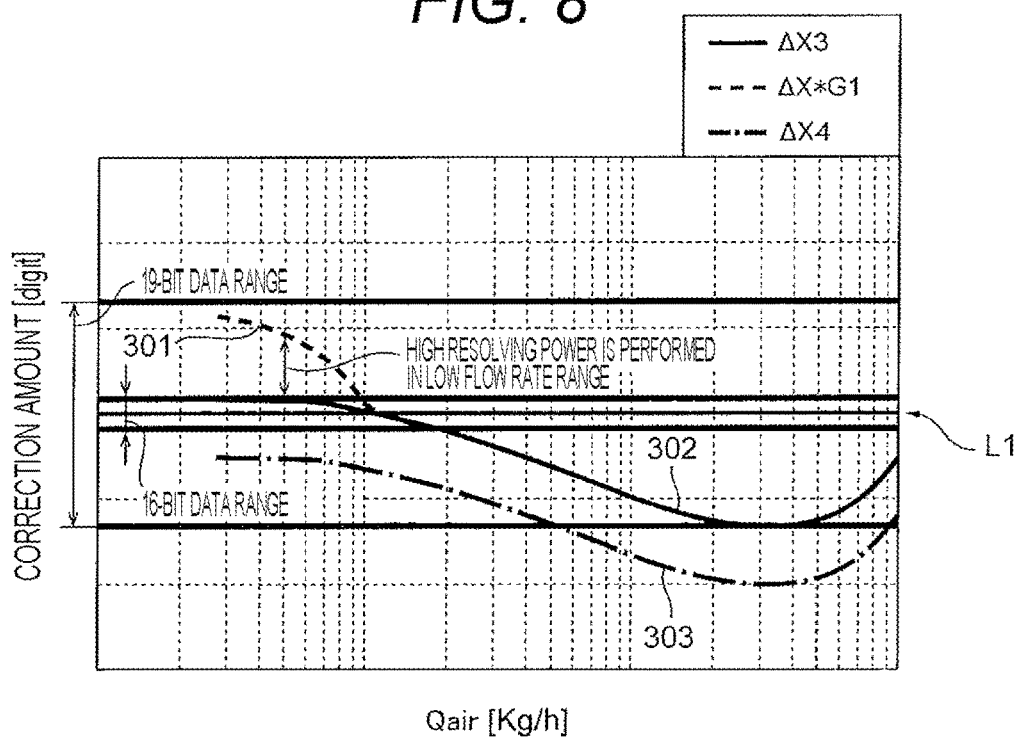
FIG. 8 is a diagram illustrating an example of a correction amount characteristic by switching a gain term.

FIG. 8 is a diagram illustrating an example of the correction amount characteristic by switching the gain term. As illustrated in FIG. 8, the horizontal axis represents the magnitude Qair [Kg/h] of the sucked air flow rate and the vertical axis represents the correction amount [digit]. A reference line L1 indicates a threshold (reference value) for switching the gain term. A solid line 302 indicates the correction amount ΔX3. A broken line 301 indicates the correction amount ΔX*G1. The correction amount ΔX2 in the low flow rate region has high resolution (G1/G2). An alternate long and short dash line 303 indicates the correction amount ΔX4. The curve of the correction amount ΔX4 is obtained by adding the offset term K2 to the correction amount ΔX3, and is obtained by shifting the curve of the correction amount ΔX3 in parallel to the lower direction by the offset term K2.

As illustrated in FIG. 8, in the region where the correction amount ΔX is greater than or equal to the threshold (reference value L1), the correction amount ΔX is in the low flow rate region. The low flow rate range can be expressed by the 16-bit data range on the low-order side. Consequently, the arithmetic unit 110 calculates the correction amount ΔX2 (=ΔX*G2) using the gain term G2 (190) for the low flow rate region in order to intensively assign the bit position having the input value to the lower bit side. Thus, the correction amount ΔX3 in the region greater than or equal to the threshold falls within the 16-bit data range as indicated by the solid line 302.

In the region where the correction amount ΔX is less than the threshold (reference value L1), the correction amount ΔX is in the relatively high flow rate region. In this case, the arithmetic unit 110 switches the target used for the multiplication to the gain term G1 (180) in order to intensively assign the bit position having the input value to the upper bit side. That is, the arithmetic expression calculating the correction amount ΔX1 (=ΔX*G1) is selected using the gain term G1 (180) for the high flow rate region.

The arithmetic unit 110 sets the correction amount ΔX1 calculated by multiplying the correction amount ΔX by the gain term G1 (180) as the correction amount ΔX3. As illustrated in FIG. 8, the correction amount ΔX3 in the region less than the threshold can be represented by the curve indicated by the solid line 302.

Figure 9:
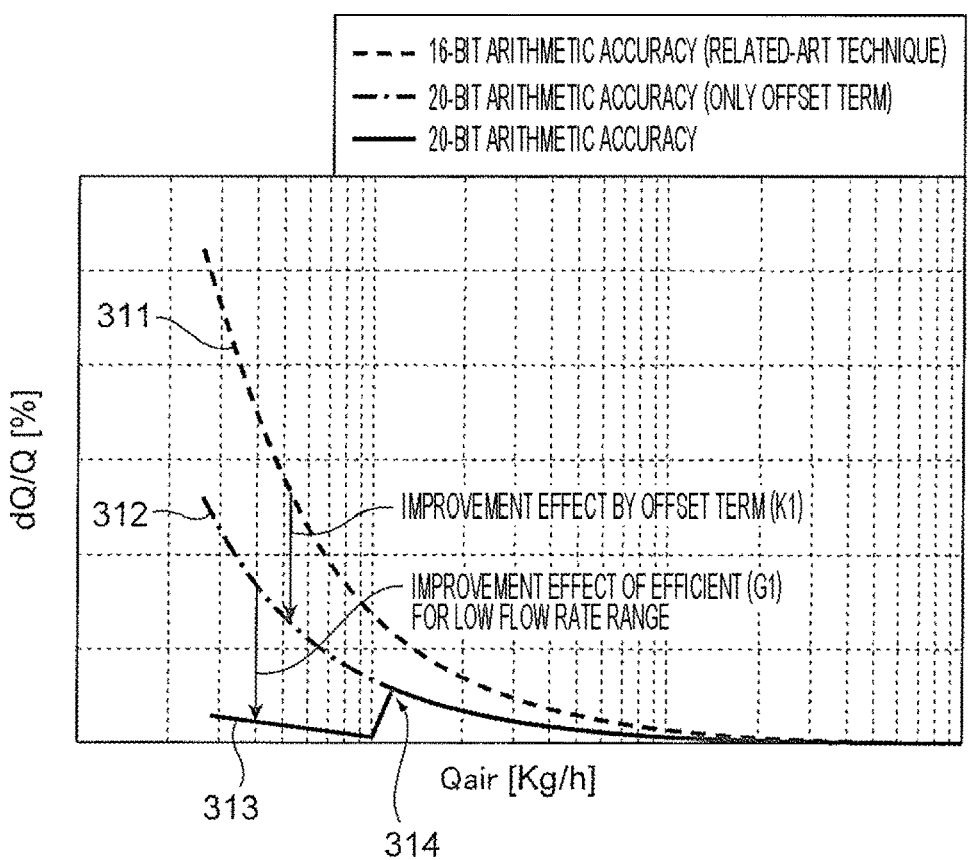
FIG. 9 is a diagram illustrating an example of improvement of a detection error regarding the intake air flow rate.

FIG. 9 is a diagram illustrating an example of improvement of a detection error regarding the intake air flow rate. As illustrated in FIG. 9, the horizontal axis represents the magnitude Qair [Kg/h] of the sucked air flow rate, and the vertical axis represents magnitude dQ/Q [%] of the detection error of the air flow rate. In addition, a curve 311 indicated by the broken line indicates 16-bit arithmetic accuracy, and a curve 312 indicated by the alternate long and short dash line indicates arithmetic accuracy corresponding to the 20 bits by the arithmetic operation in which the offset term K1 (160) is added. In addition, a curve 313 indicated by the solid line indicates arithmetic accuracy corresponding to the 20 bits by the arithmetic operation using the gain term G2 (190) in the low flow rate region. A step 314 at which the alternate long and short dash line curve 312 and the solid line curve 313 merge indicates a switching point of the gain term.

As indicated by the curve 311 in FIG. 9, it can be seen that the arithmetic error is large because the 16-bit arithmetic accuracy is insufficient in the low flow rate range. On the other hand, when the arithmetic processing according to the offset term K1 (160) is performed, it can be seen that the arithmetic error in the low flow rate region is improved to about half as indicated by the curve 312.

Furthermore, the input value can be appropriately assigned to the bit position corresponding to the flow rate region to be expressed by switching the magnitude (G2, G1) of the gain term according to the magnitude of the correction amount ΔX with respect to a predetermined threshold (reference value). Accordingly, the arithmetic error of the detected flow rate can be significantly reduced as indicated by the curve 313.

As described above, according to the air flow sensor of the second embodiment, the input value can be appropriately assigned to the bit position in the flow rate range to be expressed by appropriately switching the gain term according to the magnitude of the correction amount with respect to the threshold. Thus, the arithmetic unit can intensively improve the arithmetic resolution in the correction amount region where the high arithmetic accuracy is required.

The arithmetic unit 110 may have a threshold for the detection value X (raw data) of the air flow rate, and switch the gain term used for the arithmetic operation between the case of the detection value greater than or equal to the threshold value, namely, the high flow rate and the case of the detection value less than the threshold value, namely, the low flow rate.

Even in such the air flow sensor, similarly to the case where the threshold is provided for the correction amount ΔX, the arithmetic unit can intensively improve the arithmetic resolution in the correction amount region where the high arithmetic accuracy is required. In addition, a threshold may be given to the detection value X1 after the scaling conversion.

Figure 10:
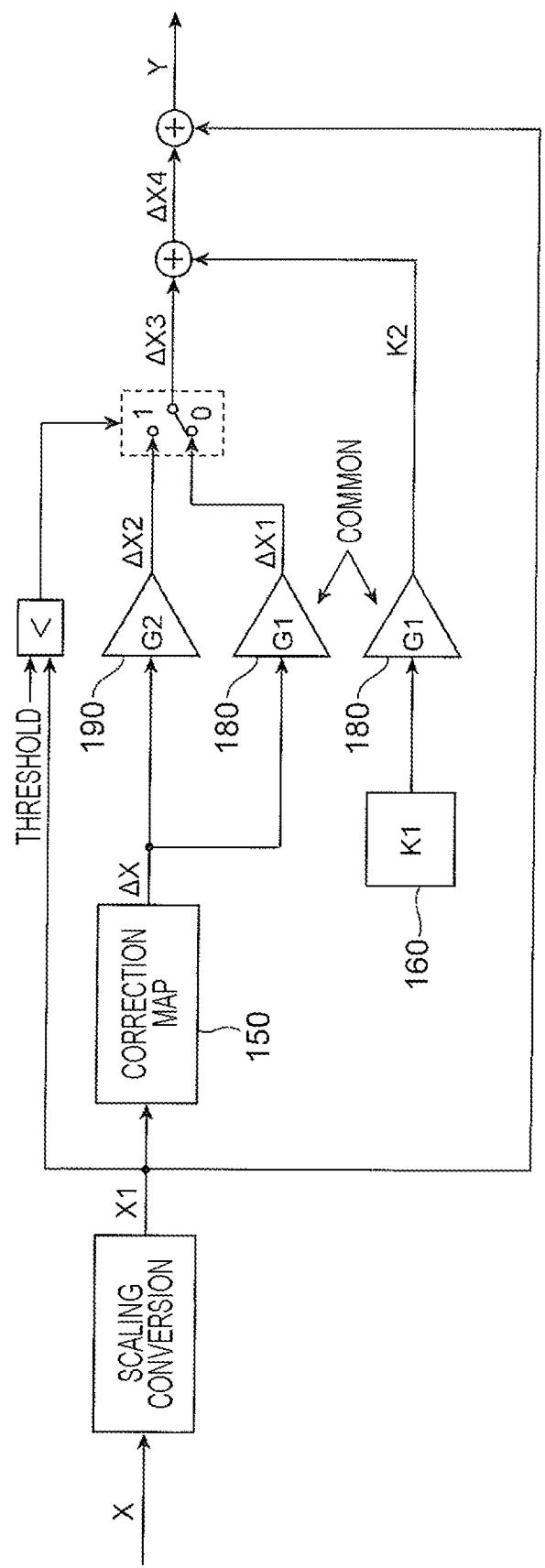
FIG. 10 is a diagram illustrating an example of the internal configuration of the arithmetic unit in the air flow sensor.

FIG. 10 is a diagram illustrating an example of an internal configuration of the arithmetic unit 110 in the air flow sensor 100 when the threshold is given to the detection value X1. As illustrated in FIG. 10, the arithmetic unit 110 switches the gain term used for the arithmetic operation between the case where the detection value X1 after the scaling conversion is greater than or equal to the threshold (that is, in the case of the high flow rate) and the case where the detection value X1 after the scaling conversion is less than the threshold (that is, in the case of the low flow rate). Even in such the air flow sensor, the arithmetic resolution can be intensively improved in the correction amount region where the high arithmetic accuracy is required.

In the above embodiments, it has been described that the arithmetic resolution is mainly improved for the low flow rate region and the high flow rate region. However, in the present invention, for example, the arithmetic resolution can be mainly improved for an intermediate flow rate region. Specifically, in the scaling conversion described above, the curve shape after the scaling conversion is adjusted to a desired shape using the m-th order expression (m is an integer of 3 or more), and a threshold for the correction amount ΔX is further provided, so that the arithmetic resolution can be intensively improved in the intermediate flow rate region.

Although the embodiment of the present invention have been described in detail above, the present invention is not limited to the above embodiment, but various design changes can be made without departing from the spirit of the present invention described in the claims. For example, the above embodiments have been described in detail for easy understanding of the present invention, and the present invention is not necessarily limited to the embodiment having all the configurations described above. A part of the configuration of an embodiment can be replaced with the configuration of another embodiment or modification, and the configuration of another embodiment can be added to the configuration of an embodiment. Furthermore, another configuration can be added to, deleted from, and replaced with other configurations for a part of the configuration of each embodiment.

REFERENCE SIGNS LIST 100 air flow sensor (physical quantity detection device)
110 arithmetic unit
120 memory
150 correction map
160 offset term
170, 180, 190 gain term

The invention claimed is:

1. A physical quantity detection device comprising:
a physical quantity detection sensor that detects a physical quantity of a measurement target gas;
a storage unit that records a correction amount corresponding to a detection value of the physical quantity detection sensor;
an arithmetic unit that performs output adjustment of the detection value using the detection value and the correction amount;
wherein resolution of the storage unit is lower than arithmetic resolution of the arithmetic unit;
wherein the arithmetic unit performs scaling conversion in which a data range of the correction amount is reduced using the detection value of the physical quantity detection sensor; and
wherein the arithmetic unit performs the scaling conversion using a linear expression.

2. The physical quantity detection device according to claim 1, wherein the arithmetic unit switches a predetermined arithmetic expression used for the arithmetic operation according to a relationship between a calculated value by the scaling conversion and a predetermined threshold with respect to the calculated value.

3. A physical quantity detection device, comprising:
a physical quantity detection sensor that detects a physical quantity of a measurement target gas;
a storage unit that records a correction amount corresponding to a detection value of the physical quantity detection sensor;
an arithmetic unit that performs output adjustment of the detection value using the detection value and the correction amount;
wherein resolution of the storage unit is lower than arithmetic resolution of the arithmetic unit;
wherein the arithmetic unit performs an arithmetic operation for reducing a resolution difference between the resolution of the storage unit and the arithmetic resolution of the arithmetic unit with respect to the correction amount referred to from the storage unit; and
wherein the arithmetic unit switches a predetermined arithmetic expression used for the arithmetic operation according to a relationship between the correction amount and a predetermined threshold with respect to the correction amount.

4. A physical quantity detection device, comprising:
a physical quantity detection sensor that detects a physical quantity of a measurement target gas;
a storage unit that records a correction amount corresponding to a detection value of the physical quantity detection sensor;
an arithmetic unit that performs output adjustment of the detection value using the detection value and the correction amount;
wherein resolution of the storage unit is lower than arithmetic resolution of the arithmetic unit;
wherein the arithmetic unit performs an arithmetic operation for reducing a resolution difference between the resolution of the storage unit and the arithmetic resolution of the arithmetic unit with respect to the correction amount referred to from the storage unit; and
wherein the arithmetic unit switches a predetermined arithmetic expression used for the arithmetic operation according to a relationship between a detection value of the physical quantity detection sensor and a predetermined threshold with respect to the detection value.

5. The physical quantity detection device according to claim 4, wherein the arithmetic unit selects the arithmetic expression for assigning information to a lower bit side of a data range of arithmetic resolution when the detection value is greater than or equal to the threshold, and
the arithmetic unit selects the arithmetic expression for assigning information to an upper bit side of a data range of arithmetic resolution when the detection value is less than the threshold.

* * * * *